United States Patent [19]

Lau

[11] Patent Number: 5,629,905
[45] Date of Patent: May 13, 1997

[54] METHOD OF DATUMING SEISMIC DATA AND METHOD OF PROCESSING SEISMIC DATA

[75] Inventor: Yiu-Wa A. Lau, Houston, Tex.

[73] Assignee: Exxon Production Research Company, Houston, Tex.

[21] Appl. No.: 127,297

[22] Filed: Sep. 24, 1993

[51] Int. Cl.$^6$ ........................................... G01V 1/36
[52] U.S. Cl. ........................... 367/54; 367/73; 364/421
[58] Field of Search ........................... 367/21, 50, 54, 367/73; 364/421

[56] References Cited

U.S. PATENT DOCUMENTS

| | | | |
|---|---|---|---|
| 4,577,297 | 3/1986 | Kalkomey et al. | 367/24 |
| 4,596,005 | 6/1986 | Frasier | 367/38 |
| 4,611,311 | 9/1986 | Frasier | 367/38 |
| 4,736,347 | 4/1988 | Goldberg et al. | 367/46 |
| 4,887,244 | 12/1989 | Willis et al. | 367/73 |
| 4,943,950 | 7/1990 | Beasley et al. | 367/50 |
| 5,073,876 | 12/1991 | Propes | 367/54 |
| 5,229,938 | 7/1993 | Wang et al. | 364/421 |

OTHER PUBLICATIONS

M. Turhan Taner and Fulton Koehler, "Surface consistent corrections", Geophysics, vol. 46, No. 1 (Jan. 1981); pp. 17–22.

M. Turhan Taner and Fulton Koehler, "Estimation and correction of near-surface time anomalies", Geophysics, vol. 39, pp. 441–463.

Lau et al; 61st Annu SEG Int. Mfg., Nov. 10, 1991, V-2, pp. 391-392, Pap. No. SP36; abst. only supplied herewith.

*Primary Examiner*—Nelson Moskowitz
*Attorney, Agent, or Firm*—J. M. Gilbreth

[57] ABSTRACT

Disclosed is a method of datuming seismic trace data from a first horizon to a lower second subsurface horizon, both located above a target horizon. A seismic source and receiver are positioned along the first horizon and each assigned a coordinate representing a position along the first horizon. The seismic trace data includes both header information and seismic data. The header information includes the coordinates assigned to the source and receiver. The seismic data is a record of reflection amplitude versus travel time of a seismic signal traveling from the source, downward through and intersecting the second horizon at a downward intersection point, reflecting upward from the target horizon, upward through and intersecting the second horizon at an upward intersection point, and upward to the receiver. The method generally includes determining for both the downward upward intersection points, coordinates along the second horizon corresponding to positions along the second horizon. The header information will now include these coordinates along the second horizon. Additionally, disclosed is a method of processing seismic trace data, in which datumed seismic trace data, datumed by any method or as described above, is now processed utilizing surface consistent algorithms to remove the effect of the subsurface between the first and second horizon.

13 Claims, 9 Drawing Sheets

METHOD OF DATUMING SEISMIC DATA AND METHOD OF PROCESSING SEISMIC DATA

BACKGROUND OF THE INVENTION

1. Field of the Invention

The present invention relates to methods of processing seismic data. In another aspect, the present invention relates to a method for datuming seismic data. In still another aspect, the present invention relates to a method for processing seismic data by datuming the seismic data and then applying surface consistent corrections.

2. Description of the Related Art

Seismic exploration generally involves generating seismic pulses at the surface of the earth by means of one or more seismic sources. The seismic pulses travel downwardly into the earth with a fractional amount being reflected and/or refracted due to differences in elastic properties at the interface of various subterranean formations.

Detectors, such as seismometers, geophones or hydrophones, produce analog electrical seismic signals or seismic trace signals in response to detected seismic wave reflections and/or refractions. The analog electric seismic signals or seismic trace signals from the detectors can then be recorded. Alternatively, the analog seismic signals or seismic trace signals from the detectors can be sampled and digitized prior to being recorded. The seismic data recorded in either manner are subsequently processed and analyzed to determine the nature and structure of the subterranean formations.

From the recorded data, a seismic section is generated. A seismic section is a seismic image depicting the subsurface layering of a section of earth along a seismic line of profile. The seismic section is an important tool which the geologist studies to determine the nature of the earth's subsurface formations. However, before an array of seismic samples can be converted into a seismic section which can be interpreted by the geologist, the seismograms must be processed to reduce the degradation due to noise.

Seismic interpretation generally involves the study of the behavior of arrival times, amplitudes, velocities, frequencies, and character of the reflections from target horizons. Any changing or anomalous behavior is of particular interest. Consequently, we require the zones of interest to be free from disturbances generated elsewhere, such as those caused by the surface and near-surface layers, subsurface horizons, subsurface anomalies, and by the energy source and field recording system.

It is known that near-surface features create not only a time shift or amplitude decay, but also a more complicated frequency dependent, time-varying filtering effect. This unwanted effect is not confined to the near-surface part of the section, but instead is present throughout the data, as energy reflected from deeper layers passes through the near-surface twice while traveling from source to reflector to receiver.

This unwanted effect can distort or even ruin the seismic data by obscuring or masking seismic events related to the reflections and/or refractions from the subterranean formations.

Prior art methods for correcting seismic data for such near-surface effects exist. For example, see Taner et al., "Surface Consistent Corrections", *Geophysics*, v. 46, pp. 17–22, and Taner et al., "Estimation And Correction Of Near-Surface Time Anomalies", *Geophysics*, v. 39, pp. 441–463. Such methods assume that the geologic conditions which effect the data are at the surface.

Unfortunately, geologic conditions other than those at the surface can cause the distortions discussed above such as time shift or amplitude decay, and the more complicated frequency dependent, time-varying filtering effect. As with near surface anomalies, the effect is not confined at or near the particular geologic condition, but rather is present throughout the data. Surface consistent corrections, which are designed to correct for geologic conditions at or near the surface, fail to correct for such subsurface anomalies.

U.S. Pat. No. 4,577,297, issued Mar. 18, 1986 to Kalkomey et al., discloses a method for enhancing recorded seismic reflection signals having undulating water bottom distortions. In this method, simulated seismic reflection signals are utilized to reposition the shots and receivers to a fictitious plane located below the water bottom.

U.S. Pat. No. 4,887,244, issued Dec. 12, 1989 to Willis et al., addresses the problem of data insufficiency in seismic traces, most commonly caused by lack of recorded data or noise. The insufficient data is interpolated using a forward and backward application of the wave equation to create a fictitious datum plane.

As discussed, both U.S. Pat. Nos. 4,577,297 and 4,887,244 rely upon the creation of a fictitious seismic plane which may not correspond to an actual physical subsurface event.

Therefore, there exists a need for a technique for eliminating effects of subsurface anomalies without the limitations of the prior art.

SUMMARY OF THE INVENTION

According to one embodiment of the present invention there is provided a method of datuming seismic trace data from a first subsurface horizon to a second subsurface horizon. The first horizon is located above the second horizon which is located above a target horizon. Generally, one or more seismic sources and receivers are positioned on the first horizon and each assigned a coordinate which corresponds to a position along the grid. The seismic trace data contains the coordinate information. The seismic trace data also contains a record of reflection amplitude as a function of travel time of a seismic signal traveling from the source, downward through and intersecting the second horizon at a downward intersection point, reflecting upward from the target horizon, upward through and intersecting the second horizon at an upward intersection point, and to the receiver. The method of this embodiment generally includes assigning to the downward and upward intersection points, coordinates corresponding to positions along the second horizon. These downward and upward intersection points now become the source and receiver, respectively, on the second horizon. These source and receiver coordinates corresponding to positions along the second horizon now became the coordinates for the seismic trace. Preferably, in the practice of this embodiment, the coordinates corresponding to positions on the second horizon are determined by reference to the position coordinates on the first horizon. The data can now be gathered into common source and receiver gathers relative to the second horizon and processed by any conventional means.

According to another embodiment of the present invention, there is provided a method of processing seismic trace data. In this embodiment, datumed seismic trace data, datumed by any method or as described above, is now processed utilizing surface consistent algorithm to remove the effect of the subsurface layer between the first and second horizons.

DETAILED DESCRIPTION OF THE INVENTION

In the method of the present invention, seismic data is acquired using any of the numerous well known seismic exploration techniques. Generally, an acoustic wave source, such as dynamite or vibrator on land, or air gun at sea, provide acoustic waves which travel downwardly into the earth and are reflected upward from subsurface reflecting interfaces. These reflected waves are received at detectors, such as seismometers, geophones or hydrophones, which produce analog electrical seismic signals or seismic trace signals.

Figure 1:
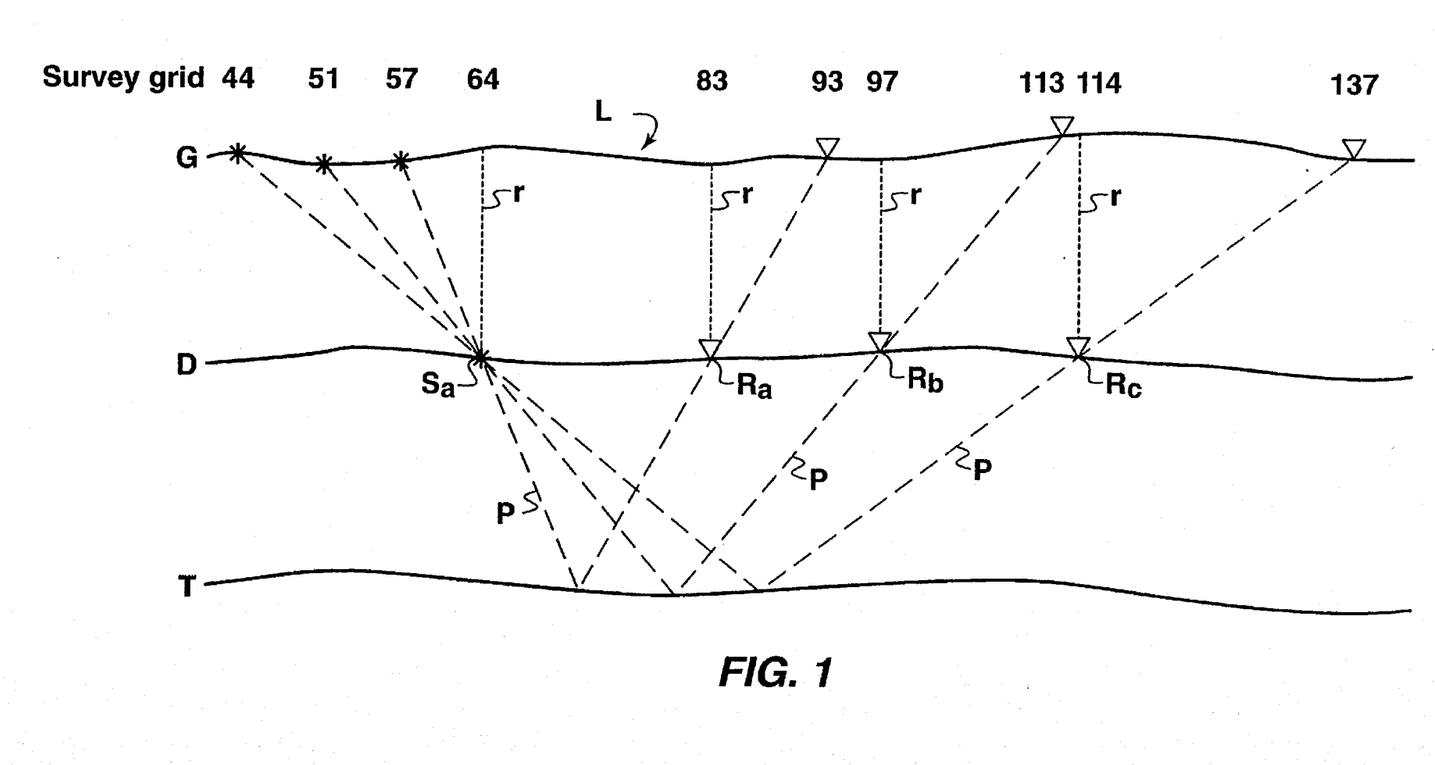
FIG. 1 is a cross-sectional view of a typical land-based geophysical exploration showing ground G, target horizon T, distorting horizon D, and sources S and receivers R. Survey grid, showing some of the position coordinates for sources and receivers along ground G is shown across the top of the figure.

FIG. 1 is a cross-sectional view of a typical land-based geophysical exploration. Shown are ground G, target horizon T, distorting horizon D, and sources and receivers, represented by asterisks and triangles, respectively. The sources and receivers are located along a seismic survey line L on the surface of ground G. Generally, to aid in processing the data, positions are sequentially numbered along the seismic survey line L. The numbering scheme is generally chosen to correspond to distance along the survey line L. In FIG. 1, the positions along survey line L for the sources and receivers is shown at the top of the figure. For example, along ground G, the sources shown have coordinates 44, 51 and 57, and the receivers shown have coordinates 93, 113 and 137. While only three sources and receivers have been shown along survey line L, it is understood that in normal geophysical exploration practice, any number of sources and receivers are utilized.

Figure 2:
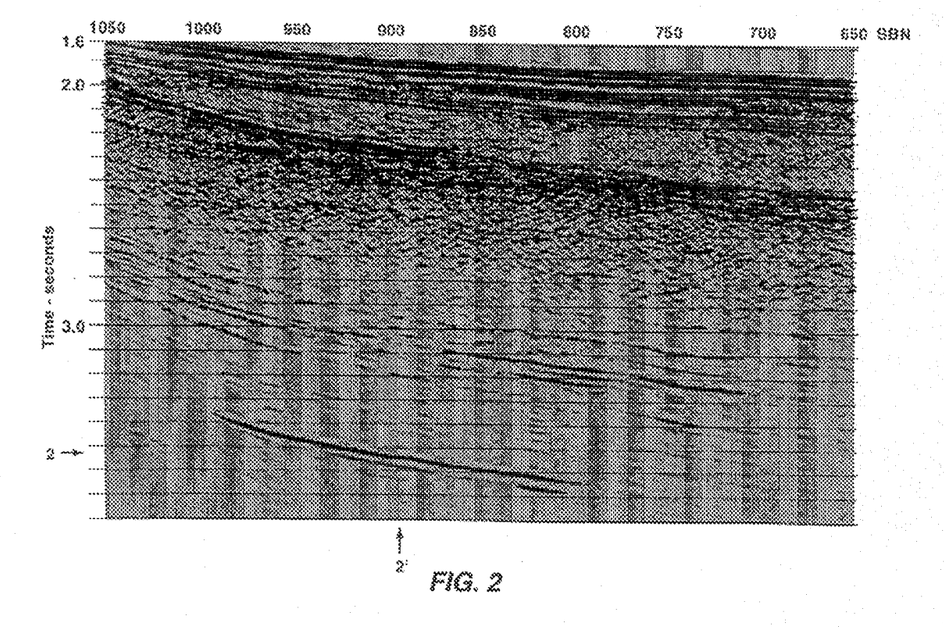
FIG. 2 shows the seismic section for data from 1.8 seconds to 3.8 seconds for stacking bin numbers (SBN) 650 to 1050. The data has been processed with Q compensation and a gain prior to stacking. Arrows 2 and 2' point out a distortion in a seismic event.

Seismic traces which may be acquired by a typical seismic survey may be seen by reference to FIG. 2. As shown in FIG. 2, the amplitude of the seismic reflections is plotted as a function of time and distance along seismic survey line L in the x direction of the earth's surface. These traces have been gathered and stacked into an x-t array commonly referred to in the industry as a "seismic section" or "seismic record".

In the practice of the present invention, the distorting horizon is first identified. This generally requires analyzing the seismic record and determining whether the amplitude and wave form for various events conform to geophysical interpretation. For example, in FIG. 2, distortions in the reflector near the intersection points of arrow 2 and arrow 2' there appears to be distortions along the seismic event. This is more clearly seen in FIG. 6 which shows an enlargement of this area of interest.

Where a featured event, such as that identified in FIG. 2., seems unlikely, the next step is to determine the cause of the distortion to the event. Generally, a geologic model is created to fit the field data to explain the unlikely event. From the model, the distorting horizon creating the unlikely event can be identified.

Once the distorting horizon has been identified, the next step in the practice of the present invention is to datum the shots and receivers to the distorting horizon. This generally requires defining source and receiver locations along the distorting horizon for each source/receiver pair.

One method of defining source and receiver locations along the distorting horizon is to utilize wave equation datuming. Wave equation datuming is well known to those of skill in the art and is described in U.S. Pat. No. 4,577,297 and U.S. Pat. No. 4,887,244 both herein incorporated by reference.

Wave equation datuming is also disclosed by Berryhill in "Wave-equation datuming", Geophysics, Vol. 44, pp. 1329–1344 and in "Wave-equation datuming before stack", Geophysics, Vol. 49, pp. 2064–2066, both also herein incorporated by reference.

It is noted that one major difference in the practice of the present invention and in the disclosure of the '297 and '244 patents in applying wave equation datuming is that in the present invention the sources and receivers are required to be datumed to the distorting horizon, whereas in the '297 and '244 patents the sources and receivers are datumed to a fictitious datum plane.

As disclosed by Berryhill, the following form of Huygen's principle is useful in extrapolating seismic waves from one datum to another:

$$U_j(t) = \frac{1}{\pi} \sum_i \Delta x_i \cos\Theta_i \frac{t_i}{r_i} [U_i(t-t_i) * F_i].$$

In this equation, subscript i ranges over all the seismic traces $U_i$ referenced to datum 1, and $U_j(t)$ is a seismic trace synthesized at some point on datum 2. Distance $r_i$, traveltime $t_i$, angle $\Theta_i$, and trace-spacing $\Delta x_i$ are defined by the physical aspects of the data and the two datums. The argument $(t-t_i)$ indicates that $U_i$ is shifted in time. $F_i$ is a filter operator of 5 to 10 points, and is a function of the subscripted variables, convolved with the trace to prevent waveform distortion. Neither datum is required to be planar, and the velocity for wave propagation is not required to be constant. Subscript i may be taken to range over the entire set of traces associated with one shot. $U_j(t)$ is then a prediction of what would have been observed by a detector located somewhere other than the surface on which the actual detectors were located.

By allowing subscript j to range over a full set of detector positions on datum 2, and then by evaluating the equation a number of times—with the $U_i$'s as input and the $U_j$'s as output—the effect of moving the detectors from datum 1 to datum 2, for one source can be predicted.

This computation may be performed independently for each shot on the seismic line. The result is a seismic line all of whose detectors have been moved from datum 1 to datum 2.

Moving the sources from datum 1 to datum 2 requires reciprocity. For present purposes, reciprocity provides that if source and receiver have identical directional characteristics (for example, if both are nondirectional), then interchanging the positions of source and receiver yields the identical seismic trace. Consider taking a seismic line and collecting together all the traces from different shots that share some particular receiver location. Reciprocity asserts that this is the same as the group of traces due to a source at the designated receiver location, with detectors deployed at the former shot locations. Reciprocity thus suggests reorganizing a seismic line into common-receiver groups and operating on each common-receiver group, independently, in accordance with the equation. The effect is as if the actual sources moved from one datum to another.

A major limitation of wave equation datuming is that substantial computation is required to execute this scheme.

In addition to utilizing conventional datuming methods, according to another embodiment of the present invention, the present invention can be practiced utilizing an inventive virtual datuming method.

In the virtual datuming method of the present invention, the first step is to raytrace the seismic signal path from the source, through the distorting event, to the target horizon, and to the receiver. Common retrace techniques utilizing Snell's law exist and any suitable method may be utilized.

Generally, to raytrace the seismic signal path, velocity information will have to be provided for each geologic layer. Such information may be provided from well information or may estimated using known velocity estimation techniques.

Referring again to FIG. 1, the raytraced seismic signal paths P between specific shots and receivers are represented by dotted lines. For simplicity of the drawing, not all of the seismic signal paths have been shown, but rather, only an illustrative few. It is understood however, that seismic signal paths can be raytraced from a given source to each receiver and/or from a given receiver to each source.

In FIG. 1, seismic signal paths P, as shown by dashed lines, are raytraced from source 44 to receiver 137, and from source 51 to receiver 113 and from source 57 to receiver 93.

Once the seismic signal paths have been raytraced, the next step in the practice of the datuming method of the present invention is to define sources and receivers along the distorting horizon.

Sources are defined at the intersection of the downwardly traveling raytraced seismic signal path with the distorting horizon. Receivers are defined at the intersection of the upwardly traveling raytraced seismic signal path with the distorting horizon.

Once defined along the distorting horizon, the sources and receivers must now be given coordinates which correspond to positions on the distorting horizon. This may be accomplished by either defining a new numerical positioning scheme along the distorting horizon, or by referencing the position numbers of seismic survey line L on ground G above. Since it is generally necessary, to refer back to events on the ground during processing, it is preferred in the practice of the present invention to number events along the distorting horizon by reference to the numbering grid of seismic survey line L.

Referring again to FIG. 1, referencing the numbered positions along the seismic survey line grid is generally accomplished by extending a vertical reference line r from the intersections of the distorting horizon with the downward traveling and upward traveling seismic signal paths to the seismic survey line L on the surface and making reference to the sequentially numbered positions on the seismic survey line L. The intersection of the downward traveling seismic signal path and the distorting horizon will correspond to a source. Likewise, the intersection of the upward traveling seismic signal path and the distorting horizon will correspond to a receiver. 10 Alternatively to utilize the numbering grid of seismic survey line L, the sources and receivers along the distorting horizon can be assigned position numbers by projecting the sequential numbering system of the seismic line onto the distorting horizon.

Referring again to FIG. 1, the source/receiver raytrace pairs, 44/137, 51/113 and 57/93 all travel downwardly and intersect the distorting horizon at point Sa and travel upwardly and intersect the distorting horizon at points Rc, Rb and Ra, respectively.

Extending a reference line r vertically from point Sa to the surface yields position 64 on the surface. Thus, the new source position for all three source/receiver raytrace pairs is position 64 at the distorting horizon.

Likewise, extending lines r vertically from points Ra, Rb and Rc to the surface yields positions 83, 97 and 114, respectively, for raytrace pairs 57/93, 51/113 and 44/137.

Each of these seismic data traces is now assigned a new source/receiver position number. For example, raytrace pairs 44/137, 51/113 and 57/93, when datumed to the distorting horizon, are now 64/114, 64/97 and 64/83, respectively.

Assigning to each trace a new source/receiver position number is an easy task. Seismic traces are generally stored in records which contain information regarding the trace in a "header" and the data information in the "data array" of the record. This datuming method merely requires reassigning the source/receiver information in the header for each seismic trace.

Notice that in the datuming method of the present invention, the seismic signal data is not altered, generated or recalculated, but rather, only the header information is changed. Since the seismic signal data remains unchanged, this method of datuming is computationally inexpensive.

Utilizing any suitable surface consistent correction method, the data is now corrected for the effect of the subterrain between the surface and the distorting horizon.

Suitable surface consistent correction methods include those disclosed by Taner et al. in "Surface Consistent Corrections", *Geophysics*, v. 46, pp. 17–22, and Taner et al., "Estimation And Correction Of Near-Surface Time Anomalies", *Geophysics*, v. 39, pp. 441–463, both herein incorporated by reference.

The data array of the seismic record contains amplitude reflection data that is recorded corresponding to arrival time measured from the time of the generation of the seismic pulse. Once the data corresponding to events above the distorting event have been utilized to make surface consistent corrections, that data is generally ignored in further processing.

Upon elimination of the effects of the subsurface above the distorting event, the distorting event is now treated as the surface and the data is further processed utilizing conventional geophysical processing techniques.

Nonlimiting examples of conventional geophysical processing techniques which may be utilized in the present invention include Q compensation, gain, stacking, migration and deconvolution.

The processing method of the present invention can be utilized on subsequent distorting events in a "layer stripping" technique.

For example, the old distorting event now becomes the surface layer with the sources and receivers positioned along the "surface", i.e. old distorting event, as already determined, and with a new distorting event and target event identified. Seismic signal paths are retraced from sources to receivers, with new sources and receivers defined and positioned along the new distorting event. The header information in each seismic trace is changed to conform to the new sources and receivers along the distorting event, and surface consistent corrections are made. This technique can be repeated for as many times as are necessary to eliminate the effects of subsequent distorting events.

It is understood that in the practice of the virtual datuming embodiment of the present invention, that seismic data may also be datumed to a second horizon that is located above the first horizon.

EXAMPLE

The method of the present invention was tested on a deep water (approximately 5000 feet) marine 2-D seismic line. The data was gathered with both cable and source in the water, using 180 channels, 25 meter group intervals and shot every 25 meters.

FIG. 2 shows the seismic section for the data from 1.8 seconds to 3.8 seconds for stacking bin numbers (SBN) 650 to 1050. The data has been processed with Q compensation and a divergence correction gain prior to stacking.

Although difficult to tell from the size of the figure, there is a vertical shift in the data between SBNs 870 to 890. This vertical shift manifests itself in the event running from SBNs 810 to 990, at about 3.15 seconds to about 3.6 seconds ("target event"), which event contains a significant distortion at about SBN 890 at 3.55 seconds (see arrows in FIG. 2). See also the enlargement of this section of interest in FIG. 6.

Once a target event has been identified as being distorted, as with the identified event in FIG. 2, the cause of the distortion must be identified. Since this is a deep water marine line, statics correction at the surface will not explain the shift.

Figure 3:
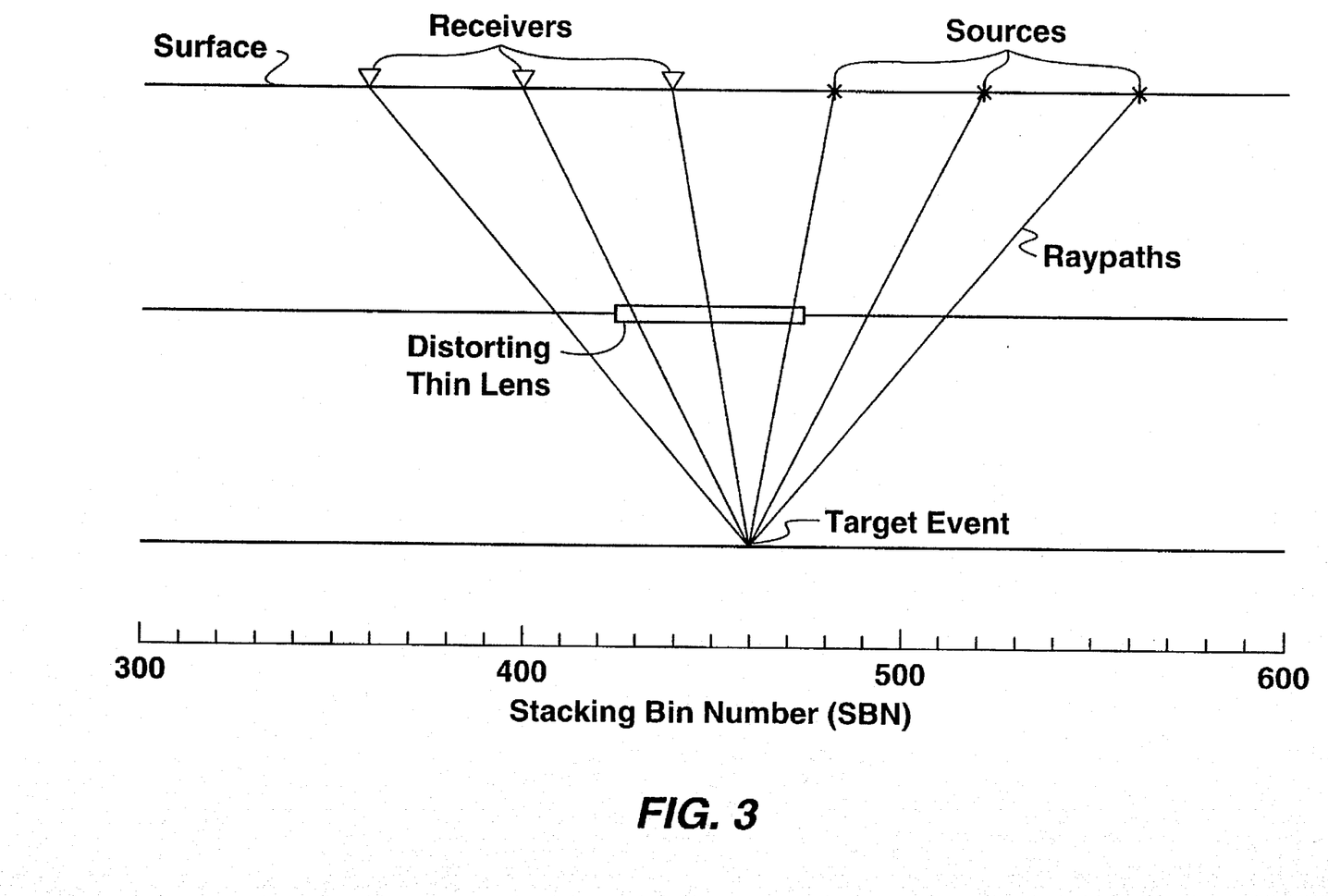
FIG. 3 shows a thin lens model developed to explain the vertical shift in the data between SBNs 870 and 890 and the distortion to the target event in FIG. 2, and shows the surface, sources, receivers, thin lens, raypaths, and the target event.

Using standard modelling techniques, a thin lens model, as shown in FIG. 3, was developed to explain the vertical shift in the data between SBNs 870 and 890 and the distortion to the target event in FIG. 2. FIG. 3 shows the surface, sources, receivers, thin lens, raypaths, and the target event.

Figure 4:
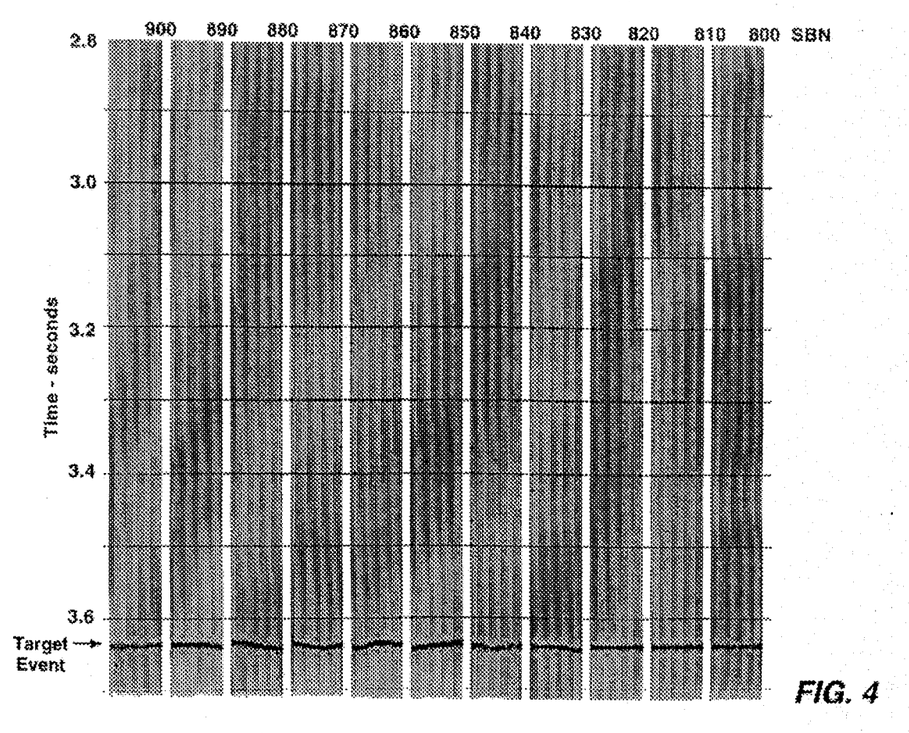
FIG. 4 is data of the model of FIG. 3 showing unstacked gathers between SBNs 800 and 900 at 2.8 to 3.7 seconds for the target event, with distortion to the target event gathers shown at SBNs 830 to 900.

FIG. 4 is data of the model of FIG. 3 showing unstacked gathers between SBNs 800 and 900 at 2.8 to 3.7 seconds for the target event. Notice the distortion to the target event gathers from SBNs 830 to 900.

Once the distorting event and target were identified, the seismic signal paths were raytraced from the sources, through the distorting event, to the target horizon, back through the distorting event and to the receivers. Velocity information was supplied from stacking velocity analysis.

Sources and receivers were defined along the distorting horizon at the downward and upward intersections of the raytraced signal paths with the distorting event. The sources and receivers along the distorting horizon were then assigned coordinates corresponding to the coordinates vertically above on the first horizon, as illustrated in FIG. 1. The coordinates for the sources and receivers along the distorting horizon were then included in the seismic trace data.

Figure 5:
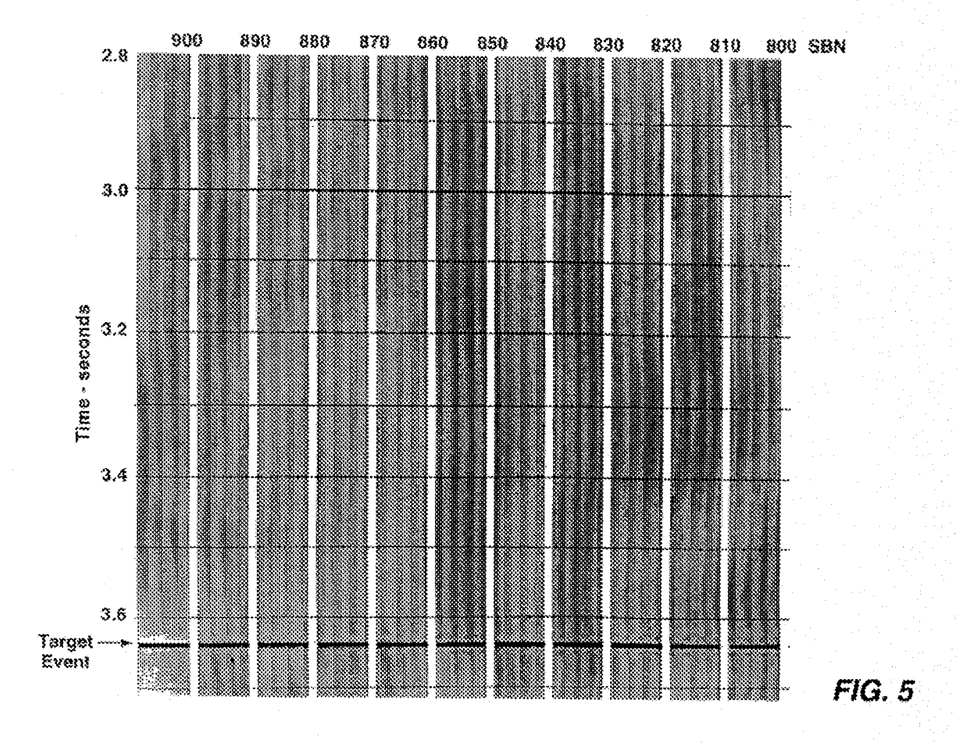
FIG. 5 shows the gathers of FIG. 4 after application of the virtual datuming method of the present invention, and after application of surface consistent processing, showing that distortion to the target event gathers from SBNs 830 to 900 has been eliminated.

FIG. 5 shows the gathers of FIG. 4 after application of the virtual datuming method of the present invention, and after application of surface consistent processing. Notice that distortion to the target event gathers from SBNs 800 to 900 has been eliminated.

Figure 6:
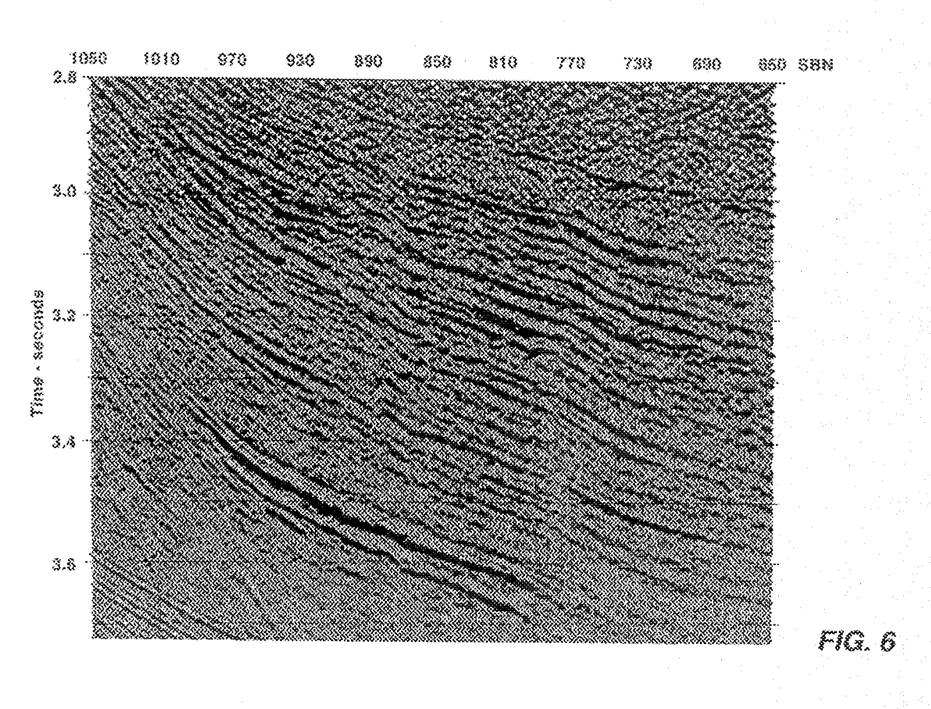
FIG. 6 is an enlarged portion of FIG. 2 from 2.8 to about 3.75 seconds, in which the data has been subject to Q compensation, gain, stacking, migration and deconvolution, with the target event running from SBNs 810 to 990, at about 3.15 seconds to about 3.6 seconds, and with distortion between SBNs 870 to 890.

FIG. 6 is an enlarged portion of FIG. 2 from 2.8 to about 3.75 seconds. In addition to Q compensation, gain, and stacking, the data in this FIG. has also been subjected to migration and deconvolution. Again, the target event can be seen running from SBNs 800 to 900, at about 3.15 seconds to about 3.6 seconds, with distortion between SBNs 870 to 890.

Figure 7:
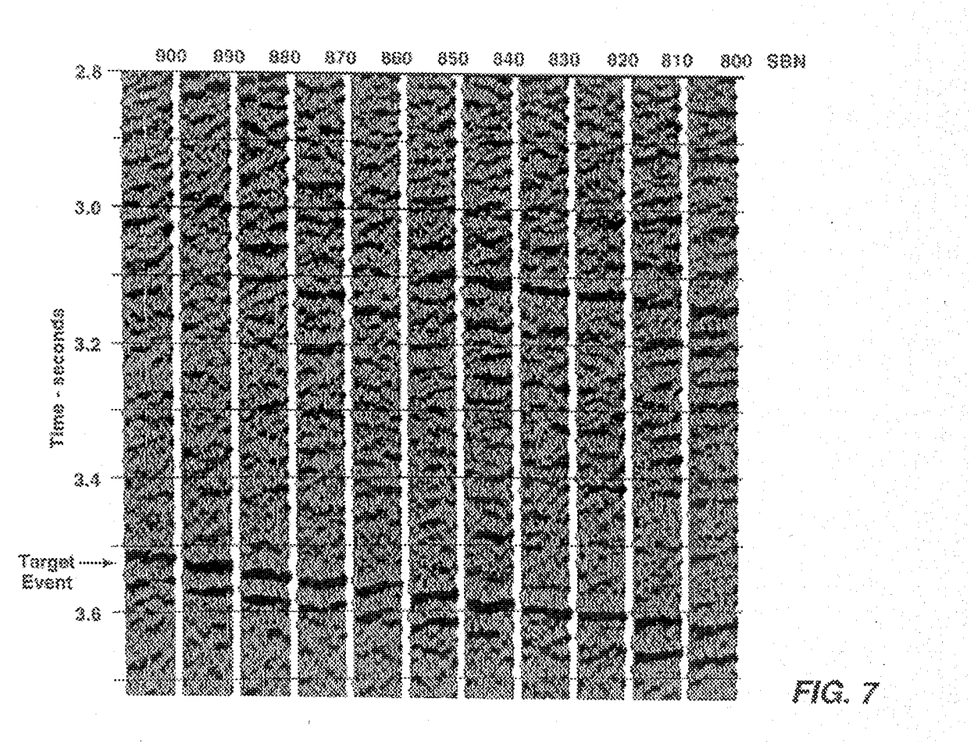
FIG. 7 is data of the FIG. 6 showing unstacked gathers between SBNs 800 and 900 at 2.8 to 3.7 seconds for the target event, showing distortion to the target event gathers from SBNs 830 to 900.

FIG. 7 is data of FIG. 6 showing unstacked gathers between SBNs 800 and 900 at 2.8 to 3.7 seconds for the target event. Notice the distortion to the target event gathers from SBNs 830 to 900.

Figure 8:
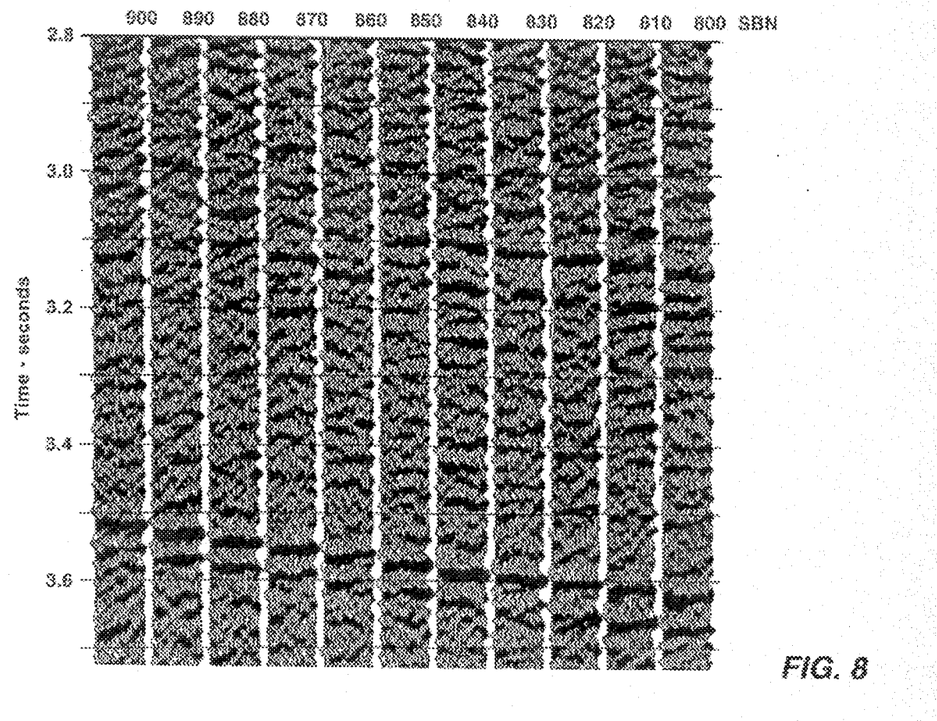
FIG. 8 shows the gathers of FIG. 7 after application of the method of the present invention, showing that distortion to the target event gathers from SBNs 830 to 900 has been eliminated.

FIG. 8 shows the gathers of FIG. 7 after application of the virtual datuming method of the present invention, and after application of surface consistent processing. Notice that distortion to the target event gathers from SBNs 800 to 900 has been eliminated.

Figure 9:
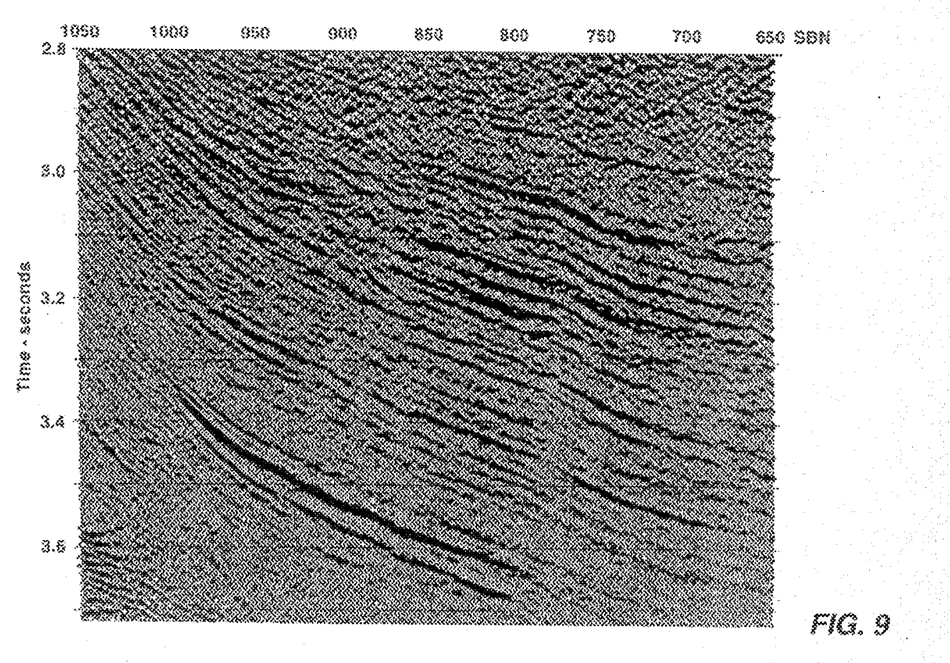
FIG. 9 is an enlarged portion of FIG. 2 from 2.8 to about 3.75 seconds, comparable to FIG. 6. In addition to Q compensation, gain, stacking, migration and deconvolution performed on the data of FIG. 6, this data has also been subject to the method of the present invention, resulting in a reduction in the distortion to the target event between SBNs 870–890 at about 3.55 seconds.

FIG. 9 is an enlarged portion of FIG. 2 from 2.8 to about 3.75 seconds, comparable to FIG. 6. In addition to Q compensation, gain, stacking, migration and deconvolution performed on the data of FIG. 6, this data has also been subject to the virtual datuming method of the present invention and surface consistent processing. Notice that the distortion to the target event between SBNs 870–890 at about 3.55 seconds has been reduced.

The description given herein is intended to illustrate the preferred embodiments of the present invention. It is possible for one of ordinary skill in the art to make various changes to the details of the present invention that are within the equivalent scope of the claimed invention, without departing from the spirit of this invention. Therefore, it is intended that all such variations be included within the scope of the present invention as claimed.

I claim:

1. A method of datuming seismic trace data from a first geologic horizon to a second geologic horizon, wherein the first horizon is located above the second horizon which is located above a target horizon, wherein a seismic source and receiver are positioned on the first horizon and each assigned a coordinate indicating its position along the first horizon, wherein the seismic trace data comprises seismic signal data and a trace data portion comprising trace coordinates, wherein the trace coordinates comprise the coordinates assigned to the source and receiver on the first horizon, and wherein the seismic signal data is a record of reflection amplitude as a function of travel time of a seismic signal traveling from the source, downward through and intersecting the second horizon at a downward intersection point, downward to and reflecting upward from the target horizon, upward through and intersecting the second horizon at an upward intersection point and to the receiver where it is recorded as seismic signal data, the method comprising:

(a) determining a source coordinate for the downward intersection point, said source coordinate corresponding to the position of the downward intersection point along the second horizon;

(b) determining a receiver coordinate for the upward intersection point, said receiver coordinate corresponding to the position of the upward intersection point along the second horizon; and (c) changing the trace data portion of the seismic trace data by assigning as trace coordinates, the source coordinate from step (a) and the receiver coordinate from step (b).

2. The method of claim 1 wherein in step (c), the trace coordinates are assigned by referencing positions on the first horizon.

3. The method of claim 1 wherein in step (c), the trace coordinates are assigned by referencing positions on the first horizon positioned vertically above the upward intersection point and the downward intersection points.

4. A method of datuming seismic trace data from a first geologic horizon to a second geologic horizon, wherein the first horizon is located above the second horizon which is located above a target horizon, wherein a seismic source and receiver are positioned on the first horizon and each assigned a coordinate indicating their position along the first horizon, wherein the seismic trace data comprises seismic signal data and a trace data portion comprising trace coordinates, wherein the trace coordinates comprise the coordinates assigned to the source and receiver on the first horizon, and wherein the seismic signal data is a record of reflection amplitude as a function of travel time of a seismic signal traveling from the source, downward through the second horizon, downward to and reflecting upward from the target horizon, upward through the second horizon and upward to the receiver where it is recorded as seismic signal data, the method comprising:

(a) raytracing the seismic signal from the source, downward through the second horizon, downward to and reflecting upward from the target horizon, upward through the second horizon and upward to the receiver to the receiver;

(b) determining from the raytraced seismic signal of step (a) a downward intersection point which is the point of intersection of the downwardly travelling raytraced seismic signal with the second horizon, and an upward intersection point which is the point of intersection of the upwardly travelling raytraced seismic signal with the second horizon;

(c) determining for the downward intersection point a source coordinate, said source coordinate corresponding to the position of the downward intersection point along the second horizon;

(d) determining for the upward intersection point a receiver coordinate, said receiver coordinate corresponding to the position of the upward intersection point along the second horizon; and (e) changing the trace data portion of the seismic trace data by assigning as trace coordinates, the source coordinate from step (c) and the receiver coordinate from step (d).

5. The method of claim 4 wherein in step (e), the trace coordinates are assigned by referencing positions on the first horizon.

6. The method of claim 4 wherein in step (e), the trace coordinates are assigned by referencing positions on the first horizon positioned vertically above the upward intersection point and the downward intersection points.

7. A method of processing seismic trace data for a geologic subsurface having first, second and target horizons, to remove the effect of the second horizon on the trace data, wherein the first horizon is located above the second horizon which is located above a target horizon, with the first and second horizon defining a first subsurface layer and the second and target horizon defining a second subsurface layer, with a seismic sources and receiver positioned along the first horizon, with the source and receiver each assigned a coordinate indicating its position along the first horizon, and wherein the seismic trace data comprises seismic signal data and a trace data portion comprising trace coordinates, wherein the trace coordinates comprise the coordinates assigned to the source and receiver and wherein the seismic trace data is a record of a reflection amplitude versus travel time of a reflection of a seismic signal traveling from the source, downward through the first subsurface layer, downward through and intersecting the second horizon at a downward intersection point, downward through the second subsurface layer, to and reflecting upward from the target horizon, upward through the second subsurface layer, upward through and intersecting the second horizon at an upward intersection point, upward through the first subsurface layer, and upward to the receiver where it is recorded as seismic signal data, the method comprising:

(a) determining a source coordinate for the downward intersection point, said source coordinate corresponding to the position of the downward intersection point along the second horizon;

(b) determining a receiver coordinate for the upward intersection point, said receiver coordinate corresponding to the position of the upward intersection point along the second horizon; and (c) changing the trace data portion of the seismic trace data by assigning as trace coordinates, the source coordinate from step (a) and the receiver coordinate from step (b);

(d) repeating steps (a) through (c) for seismic trace data for the geologic subsurface corresponding to other source and receivers;

(e) gathering together seismic reflection signals at common source and receiver points along the second horizon;

(f) applying surface consistent algorithms to remove the effect of the first subsurface layer.

8. The method of claim 7 wherein in step (c), the trace coordinates are assigned by referencing positions on the first horizon.

9. The method of claim 7 wherein in step (c), the trace coordinates are assigned by referencing positions on the first horizon positioned vertically above the upward intersection point and the downward intersection points.

10. The method of claim 7 further comprising applying to the seismic trace data at least one processing technique selected from the group of processing techniques consisting of Q compensation, gain, stacking, migration and deconvolution.

11. A method of processing seismic trace data for a geologic subsurface having first, second and target horizons, wherein the first horizon is located above the second horizon which is located above a target horizon, with the first and second horizon defining a first subsurface layer and the second and target horizon defining a second subsurface layer, wherein a seismic source and receiver are positioned on the first horizon, and wherein the seismic trace further comprises a header portion having coordinates for the source and receiver, the method comprising:

(a) datuming the source and receiver from the first horizon to the second horizon by changing the coordinates for the source and receiver in the header portion of the seismic trace;

(b) applying surface consistent algorithms to remove the effect of the first subsurface layer.

12. The method of claim 11 wherein the datuming of step (a) comprises wave equation datuming.

13. The method of claim 11 further comprising applying to the seismic trace data at least one processing technique selected from the group of processing techniques consisting of Q compensation, gain, stacking, migration and deconvolution.

* * * * *